US010053242B2

United States Patent
Yew et al.

(10) Patent No.: US 10,053,242 B2
(45) Date of Patent: Aug. 21, 2018

(54) LOW FRICTION REACTION WHEEL SYSTEM AND CONTAINMENT STRUCTURE WITH INTEGRATED ELECTROMAGNETS

(71) Applicant: The United States of America as represented by the Administrator of the National Aeronautics and Space Administration, Washington, DC (US)

(72) Inventors: Alvin G. Yew, Rockville, MD (US); Matthew C. Colvin, Ellicott City, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 305 days.

(21) Appl. No.: 14/858,420

(22) Filed: Sep. 18, 2015

(65) Prior Publication Data

US 2017/0081049 A1    Mar. 23, 2017

(51) Int. Cl.
| | |
|---|---|
| H02K 7/09 | (2006.01) |
| B64G 1/28 | (2006.01) |
| G01D 5/20 | (2006.01) |
| H02K 21/22 | (2006.01) |
| H02K 7/02 | (2006.01) |
| H02K 11/21 | (2016.01) |

(52) U.S. Cl.
CPC ............... B64G 1/283 (2013.01); G01D 5/20 (2013.01); H02K 7/02 (2013.01); H02K 21/22 (2013.01); H02K 11/21 (2016.01); Y02E 60/16 (2013.01)

(58) Field of Classification Search
CPC ............ H02K 11/21; H02K 7/02; H02K 7/09
See application file for complete search history.

(56) References Cited

U.S. PATENT DOCUMENTS

| | | | | |
|---|---|---|---|---|
| 2,268,687 | A * | 1/1942 | Young | H02K 33/04 310/30 |
| 4,127,835 | A * | 11/1978 | Knutson | H01F 7/1615 310/30 |
| 4,934,781 | A * | 6/1990 | Kato | F16C 27/02 310/90.5 |
| 7,088,019 | B2 * | 8/2006 | Takada | B81B 5/00 310/156.32 |

\* cited by examiner

*Primary Examiner* — Dang Le
(74) *Attorney, Agent, or Firm* — Matthew F. Johnston; Bryan A. Geurts; Mark P. Dvorscak

(57) ABSTRACT

The disclosed subject matter relates to a reaction wheel system for controlling and stabilizing a satellite or other spacecraft. The reaction wheel system includes a reaction wheel rotor and a containment structure stator including a plurality of contactor assemblies for securing the reaction wheel rotor when not in rotation and for electromagnetically inducing substantially frictionless rotation of the reaction wheel rotor.

18 Claims, 10 Drawing Sheets

LOW FRICTION REACTION WHEEL SYSTEM AND CONTAINMENT STRUCTURE WITH INTEGRATED ELECTROMAGNETS

FIELD OF THE INVENTION

This invention relates to a reaction wheel system used in attitude control systems for spacecraft.

BACKGROUND

Spacecraft are important platforms in space (e.g., earth orbit) for facilitating electronic communications or positioning orbital sensors. In order to maximize their utility, it is often vital to have the ability to control 1) the position of such a spacecraft in space relative to, for example, a heavenly body to which it orbits; and 2) the attitude, or orientation. In particular, without being able to achieve adequate attitude stabilization, at best case the sensors or communication devices cannot function with desired fidelity, and at worst case, instrument systems may become completely inoperable. Therefore, a properly designed attitude control system is important because it often provides mission critical functions such as communications using directional antennas, energy harvesting using solar panels, and instrument pointing.

In the past, attitude stabilization on spacecraft has utilized various technologies including, for example, conventional flywheel mechanisms, control moment gyroscopes, and attitude control thrusters. Such systems have disadvantages including high levels of jitter, degraded performance with time, and a short-life, particularly with the latter technology because the amount of expendable fuel is finite. Magnetic torquers that interact with the Earth's magnetic field have also been used, but such technologies cannot produce sufficiently large torques for fast correction of attitude errors.

It is important to have a means of spacecraft pointing that is highly controllable and accurate as well as one that experiences minimal mechanical wear in order to yield extended life for the system and the spacecraft itself.

BRIEF DESCRIPTION

In one embodiment, a reaction wheel system is provided for the control and stabilization of a spacecraft. The reaction wheel system comprises a reaction wheel rotor and a containment structure stator. The reaction wheel rotor is substantially circular and has an exterior surface including a circumferential surface. The exterior surface of the reaction wheel rotor comprises a plurality of permanent magnets that are evenly spaced on the circumferential surface and are positioned such that the same magnetic pole of each faces outward and a lubricant. The containment structure stator secures the reaction wheel rotor when not in rotation and during rotation, electromagnetically induces substantially frictionless rotation of the reaction wheel rotor. The containment structure stator comprises an enclosure including a wall defining an interior space in which the reaction wheel rotor is positioned, a plurality of contactor assemblies positioned in the wall to secure the reaction wheel rotor when not in rotation, electromagnets positioned in the wall to electromagnetically induce rotation of the reaction wheel rotor and a plurality of encoders to determine the position of the permanent magnets on the reaction wheel rotor. Each contactor assembly includes a housing with first and second ends and a channel therebetween, a contactor positioned at the first end of the housing and extending into and moveable in the channel of the housing and a spring positioned in the channel of the housing and having first and second ends, the first end of the spring is connected to the contactor and the second end of the spring is moveably fixed in the channel of the housing. Each contactor assembly is positioned in the wall of the enclosure such that the first end of the contactor assembly housing is positioned toward the reaction wheel rotor. The lubricant is at least positioned on the exterior surface of the reaction wheel rotor that may contact each contactor of the contactor assembly and operates in cooperation with at least one contactor as a passive release mechanism when the electromagnets induce rotation of the reaction wheel rotor and hydrodynamic pressure is generated to push the contactor into the housing of the contactor assembly.

In another embodiment, a contactor assembly of a containment structure stator is provided. The contactor assembly is for securing a reaction wheel rotor when not in rotation and for electromagnetically inducing rotation of the reaction wheel rotor. The contactor assembly comprises a housing with first and second ends and a channel therebetween, a contactor positioned at the first end of the housing and extending into and moveable in the channel of the housing, a spring positioned in the channel of the housing and having first and second ends, the first end of the spring is connected to the contactor and the second end of the spring is moveably fixed in the channel of the housing and an electromagnet including a length of wire having first and second ends wrapped around at least a portion of the housing of the contactor assembly, the first and second ends of said wire configured to be connected to an electrical power source.

In another embodiment, a reaction wheel system is provided for the control and stabilization of a spacecraft. The reaction wheel system comprises a reaction wheel rotor and a containment structure stator. The reaction wheel rotor is substantially circular and has an exterior surface including a circumferential surface. The exterior surface of the reaction wheel rotor comprises a plurality of permanent magnets that are evenly spaced on the circumferential surface and are positioned such that the same magnetic pole of each faces outward and an electrically non-conductive lubricant exhibiting low outgassing properties and good shear stability. The containment structure stator secures the reaction wheel rotor when not in rotation and during rotation, electromagnetically induces substantially frictionless rotation of the reaction wheel rotor. The containment structure stator comprises an enclosure including a wall defining an interior space in which the reaction wheel rotor is positioned, a plurality of contactor assemblies positioned in the wall to secure the reaction wheel rotor when not in rotation and a plurality of encoders to determine the position of the permanent magnets on the reaction wheel rotor. Each contactor assembly includes a housing with first and second ends and a channel therebetween, a bearing positioned in the channel and at the first end of the housing, a contactor positioned and moveable in the bearing at the first end of the housing and extending into and moveable in the channel of the housing, a spring positioned in the channel of the housing and having first and second ends, the first end of the spring is connected to the contactor and the second end of the spring is moveably fixed in the channel of the housing and an electromagnet including a length of wire having first and second ends wrapped around at least a portion of the housing of the contactor assembly, the first and second ends of said wire configured to be connected to an electrical power source. Each contactor assembly is positioned in the wall of the enclosure such that the first end of the contactor assembly housing is positioned toward the reaction wheel rotor. The lubricant is at least positioned on the exterior surface of the reaction wheel rotor that may contact each contactor of the contactor assembly and operates in cooperation with at least one contactor as a passive release mechanism when the electromagnets induce rotation of the reaction wheel rotor and hydrodynamic pressure is generated to push the contactor into the housing of the contactor assembly.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

High-fidelity spacecraft pointing is usually accomplished with reaction wheels (RWs), which are momentum transfer devices consisting of cylindrical flywheels that are inertially coupled to the main spacecraft body. A torque in the RW system imparts a reaction torque on the spacecraft to produce a perturbation in spacecraft orientation, i.e., attitude maneuver. For three-axis stabilization and control, at least one can be used in three independent axes, with additional reaction wheels that can be provided for the purposes of redundancy (i.e., back-up) and improved control authority. Spacecraft may also be stabilized by the use of reaction wheels, either alone or in conjunction with other attitude control technologies such as thrusters and/or magnetic torquers. Reaction wheels also benefit spacecraft exposed to high disturbance torques, such as atmospheric drag in Low Earth Orbit (LEO) since some missions without such systems cannot adequately dump momentum, either because magnetic torque rods are too weak or because some spacecraft, such as a smallsat bus, may not be equipped with attitude thrusters.

Described herein are embodiments of a reaction wheel system and containment structure of a reaction wheel used for controlling and stabilizing a satellite or other spacecraft. Embodiments achieve this control and stabilization with a motor (or "reaction wheel") capable of storing momentum in a rotor. A common arrangement for reaction wheels can, for example, include the use of three or more reaction wheels, whose axes are orthogonal, or at angles that provide components along the three orthogonal spacecraft axes, thereby providing three-axis control of the spacecraft attitude, one each axis of yaw, pitch, and roll.

Spacecraft as used herein includes manned and unmanned vehicles utilized in space (including planetary orbit, Low Earth Orbit (LEO) as well as outside planetary orbit, e.g., deep space). Such vehicles may include, for example, interplanetary vehicles, satellites, space-stations or modules thereof and rockets and modules or parts thereof.

Figure 1A:
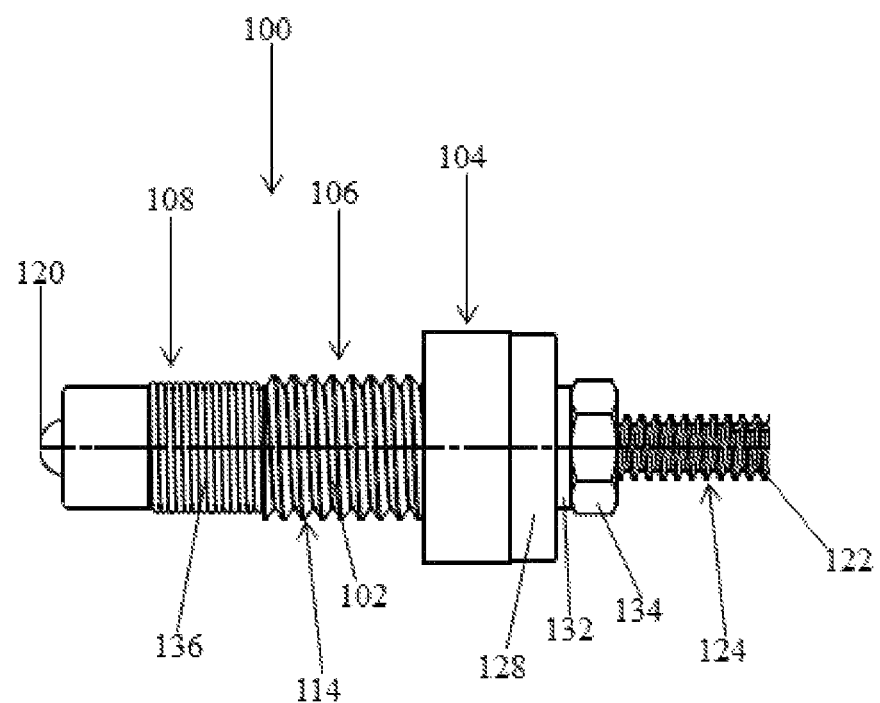
FIG. 1A is a perspective view of a contactor assembly.
Figure 1B:
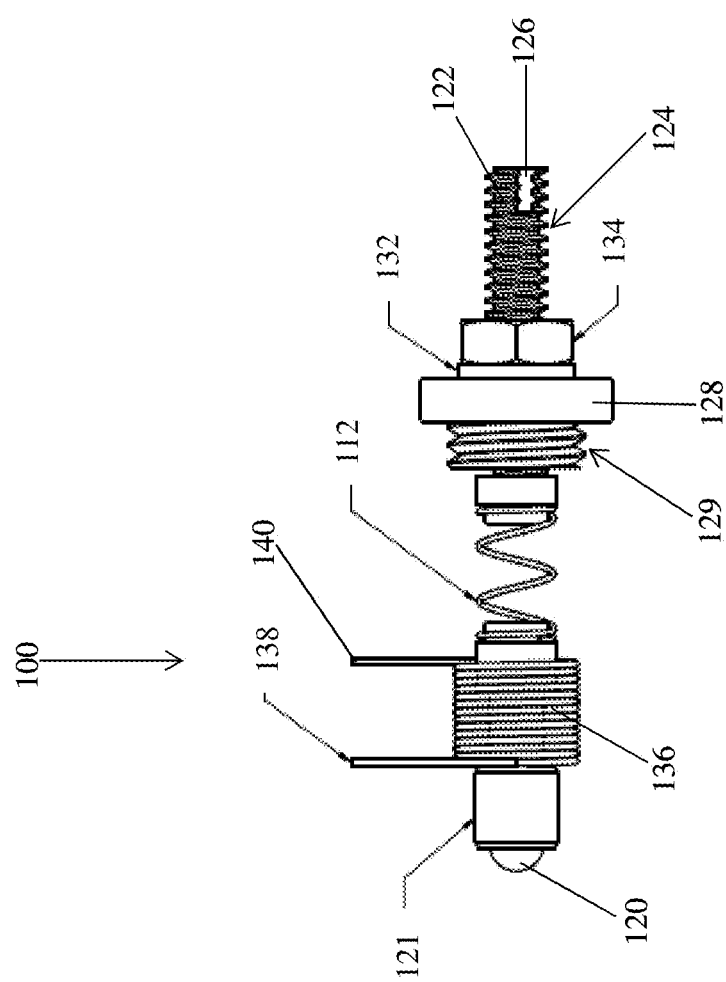
FIG. 1B is a perspective view of a contactor assembly without the housing.
Figure 1C:
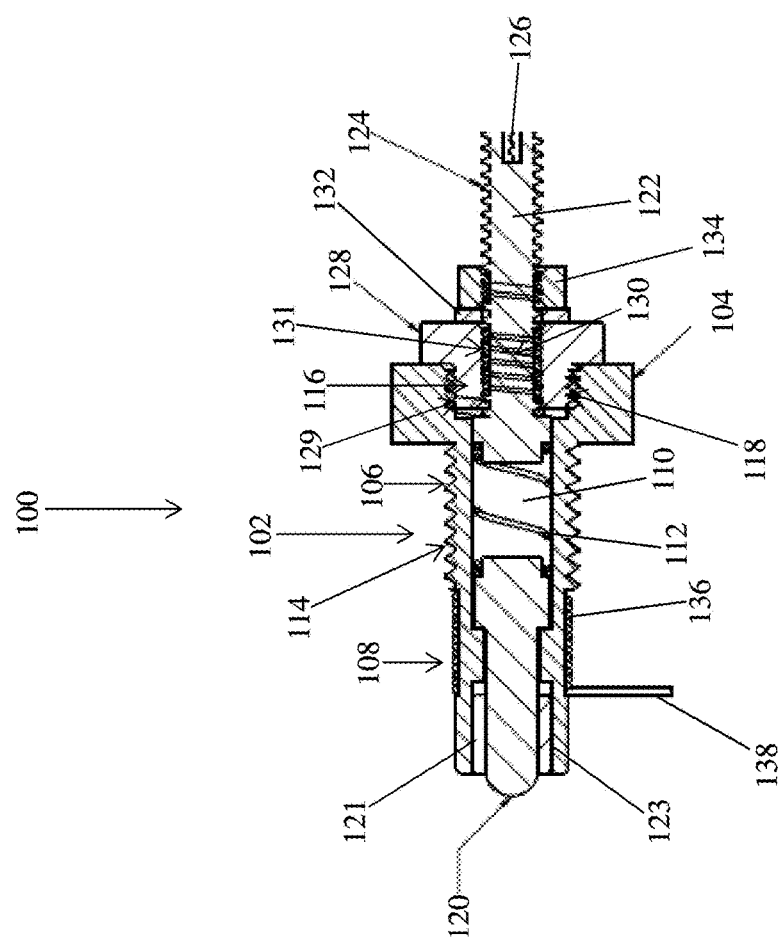
FIG. 1C is a cross-sectional view of a contactor assembly.

One exemplary embodiment of a contactor assemble used in the containment structure is shown in FIG. 1A, FIG. 1B and FIG. 1C. Contactor assembly 100 includes a housing 102 with a top section 104, a middle section 106 and a bottom section 108. Bottom section 108 is at a first end of housing 102 and top section 104 is at a second end of housing 102. A channel 110 extends between the first and second ends of housing 102 with a spring 112 positioned therein. Housing 102 and the sections of housing 102 may have a substantially circular cross-section with an axial length, an exterior diameter and an exterior circumference. The middle section 106 may include an external helical flight 114. Top section 104 includes a top section bore 116 that is part of channel 110, bore 116 having an external wall with a helical flight 118. Helical flight 118 is therefore positioned on an internal wall of top section 104. Spring 112 is in contact with a contactor 120, which is positioned in a bearing 121, at one end and a spring plunger 122 at the other end. Bearing 121 is positioned in a bottom section bore 123 that is part of channel 110. Contactor 120 is moveable in bearing 121 and extends into and is moveable in channel 110 of housing 102, the movement of contactor 120 including movement along the length of channel 110 from the first end to the second end of housing 102.

Spring plunger 122 includes an external helical flight 124 and a split 126 at the opposite end of the spring plunger 122 to which spring 112 is in contact. Spring plunger 122 is positioned in bore 116 and may extend into the rest of channel 110. Spring cap 128 is positioned in bore 116 of top section 104 and includes an external helical flight 129 and a channel 130 with an internal helical flight 131, the external helical flight 129 being complementary to helical flight 118 of bore 116. In this embodiment, spring plunger 122 is positioned in spring cap 128 and is such that the internal helical flight 131 of channel 130 is complementary to the external helical flight 124 of spring plunger 122.

Also connected to the external helical flight 124 of spring plunger 122 is washer 132 and nut 134. Washer 132 has a central opening having a diameter at least large enough to have the spring plunger slide therethrough. Nut 134 has a central opening having an interior helical flight, the helical flight of nut 134 being complementary to the external helical flight 124 of spring plunger 122 and the central opening of nut 134 having a diameter at least large enough for the interior helical flight of nut 134 to engage the external helical flight 124 of spring plunger 122. Spring plunger 122 can be moveably fixed and adjusted in and out of housing 102 by rotating nut 134 away from spring cap 128 and using split 126 to rotate spring plunger 122 to the desired position in channel 110 resulting in the desired compression of spring 112 therein and force against contactor 120. Once the desired position is achieved, nut 134 is rotated closer to spring cap 128 and with a resulting force while pressing against washer 132, spring plunger 122 is secured in position. Contactor 100 may also include an external wrap of copper wire 136 around at least a portion of the bottom section 108 of housing 102. External wrap of copper wire 136 may include terminal ends 138 and 140 at opposite ends of the length of copper wire used to form the wrap. The external wrap of copper wire 136 operates as an electromagnet in cooperation with other components as part of the reaction wheel system including components that provide electrical current to the copper wire by connecting terminal ends 138 and 140 to an electrical power source. In addition to copper, other suitable materials include aluminum or any material sold as "magnet wire." Other parts of the contactor assembly comprise suitable non-magnetic materials, such as, for example, titanium. Preferred materials may include aluminum for housing 102, contactor 120, spring plunger 122 and spring cap 128; stainless steel for washer 132 and nut 134; phosphor bronze for spring 112; and polymer composite (for example, polytetrafluoroethylene (PTFE)) coated bronze for bearing 121. Contactor 120 may have various surface contours, such as, for example, a hemispherical cross-section as shown and may also be polished and finished with a low coefficient friction material such as Diamond-Like Carbon (DLC) coating.

The power of the electromagnet formed by the external wrap of copper wire 136 is based on several design criteria including, for example, the diameter of the copper wire, the number of turns of the copper wire wrapped around the housing, the external diameter size of housing 102 around which the copper wire is wrapped and the amount of electrical current passing through the copper wire. The power of the electromagnet for each contactor assembly may range from about 10 Watts to about 50 Watts, preferably from about 10 Watts to about 15 Watts.

Figure 2A:
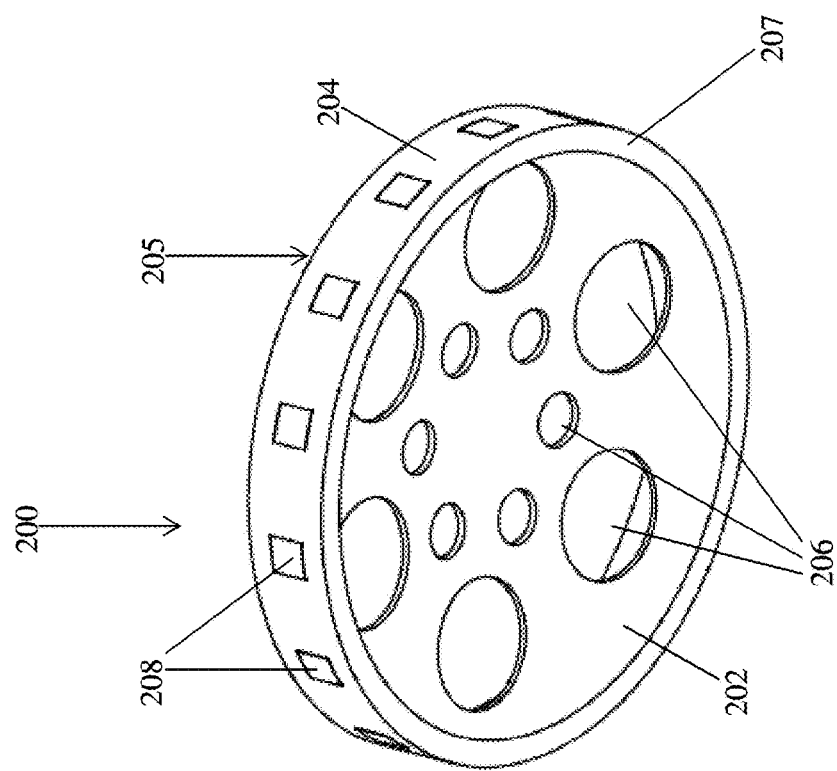
FIG. 2A is a bottom perspective view of a reaction wheel.
Figure 2B:
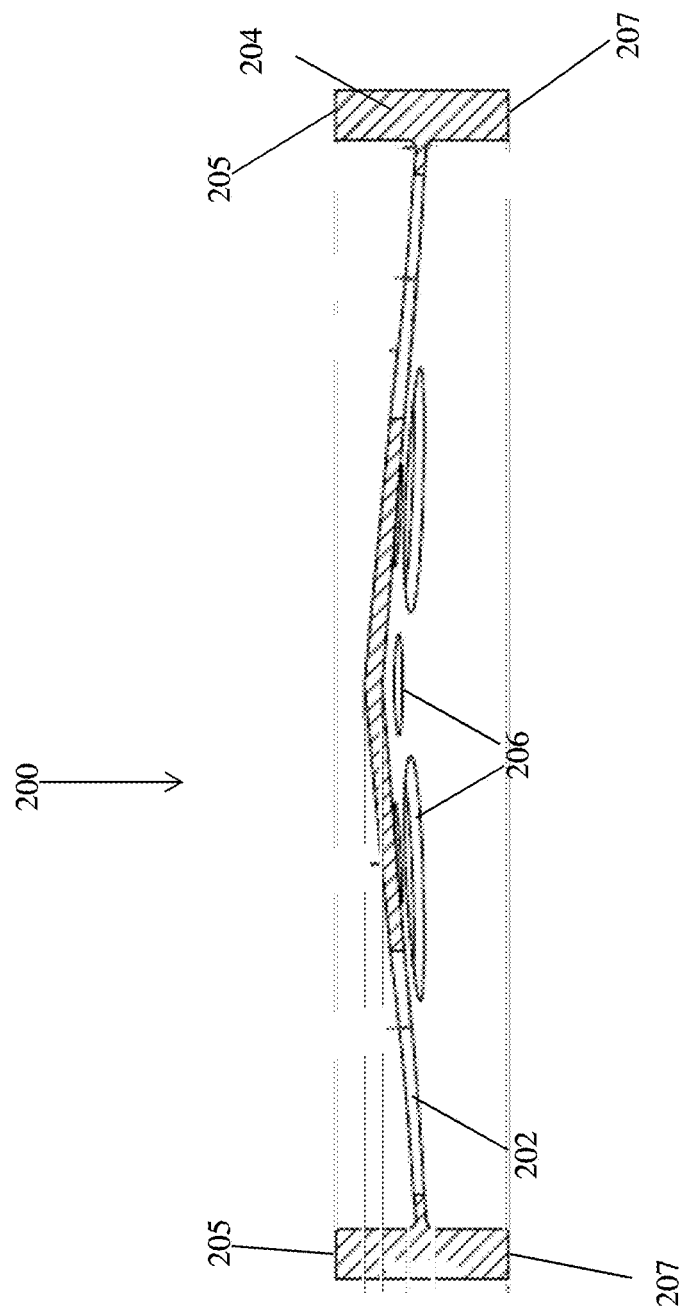
FIG. 2B is a cross-sectional view of a reaction wheel.

One exemplary embodiment includes a reaction wheel used in the system as shown in FIG. 2A and FIG. 2B. Reaction wheel 200 includes a plate 202 and a circumferential rim 204, the exterior surface of each make up the exterior surface of reaction wheel 200. Plate 202 is substantially circular and may be flat or angled, the latter shown in FIG. 2B, and may include a series of apertures 206, including, for example circular apertures. Circumferential rim 204 has edges 205 and 207 that may, for example, be flat (as shown in FIGS. 2A and 2B) or rounded. The apertures 206 are configured to reduce mass while optimizing inertia about the central axis, but may also be used, for example, in which to mount counterweights to reaction wheel 200. The circumferential surface of the circumferential rim 204 may include a plurality of permanent magnets 208, preferably evenly spaced along the circumference of the circumferential rim 204 and such that the permanent magnets all have the same magnetic pole facing outward from the wheel. Reaction wheel 200 comprises non-magnetic material between and around the permanent magnets 208. The non-magnet material may include, for example, plastic, aluminum, stainless steel, tungsten and combinations thereof including composite materials such as metal-matrix composites and reinforced plastics. Reaction wheel 200 may range in diameter, if scaled with other interfacing components, from about 2 in. to about 18 in., preferably from about 4 in. to about 10 in. The mass of the reaction wheel 200 may range from about 0.2 lbm to about 1.5 lbm., preferably from about 0.3 lbm to about 0.6 lbm.

Figure 3:
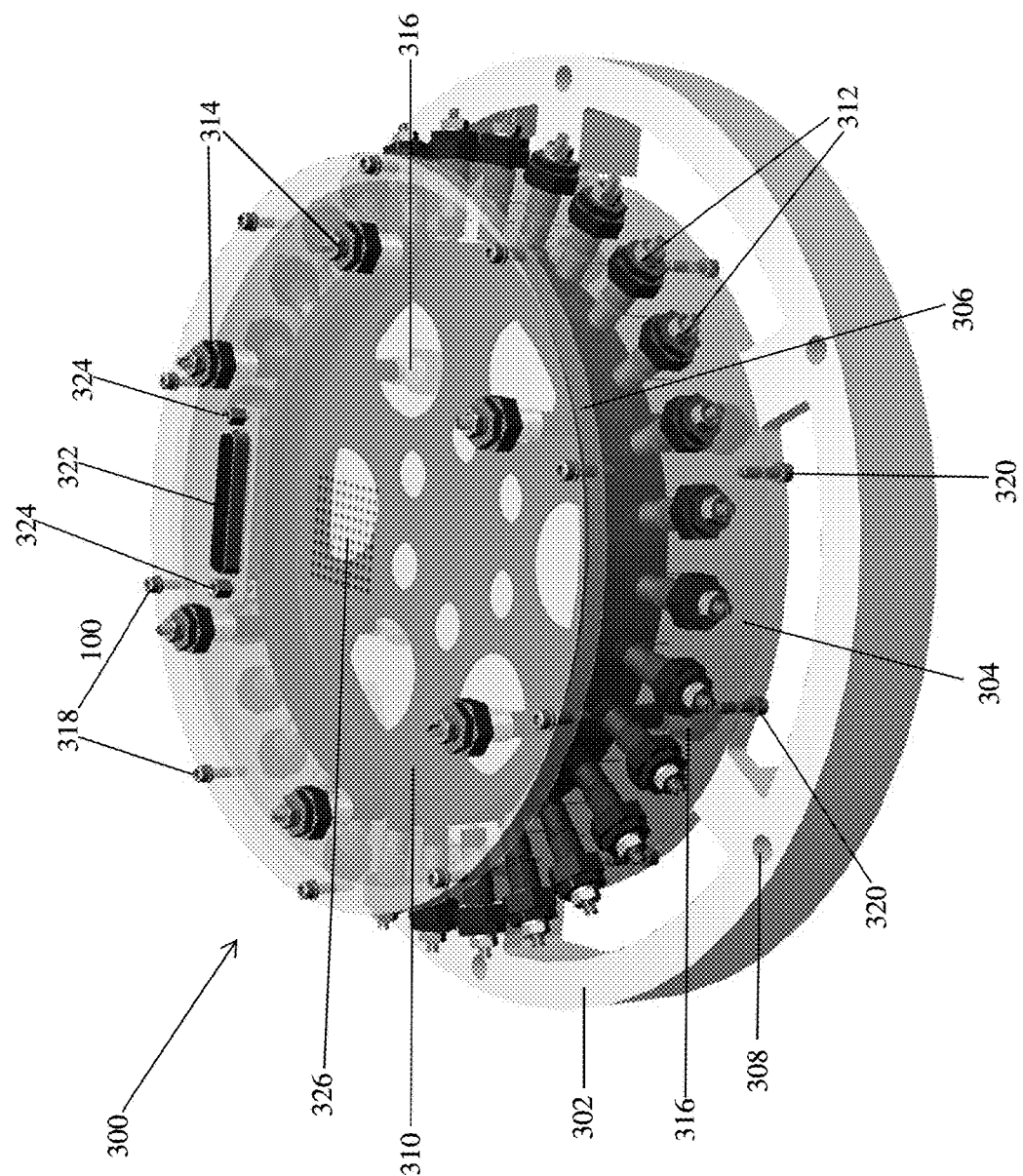
FIG. 3 is a top perspective view of a reaction wheel system.

One exemplary embodiment includes a reaction wheel system 300 as shown in FIG. 3. Reaction wheel system 300 comprises a containment structure (the "stator") including an enclosure base 302, a circumferential enclosure 304 and a top enclosure 306 made of aluminum. Enclosure base 302 may include apertures 308 that can be utilized in cooperation with screws, bolts or other means of attachment to connect the reaction wheel system 300 directly or indirectly to the structure of a spacecraft. Within the containment structure is reaction wheel 310 (the "rotor"), for example, that were shown in FIGS. 2A and 2B and described in more detail previously. Positioned in circumferential enclosure 304 are contactor assemblies 312, for example, those that were shown in FIGS. 1A-1C and described in more detail previously. As exemplified in FIG. 3, each contactor assembly 312 is positioned about the circumferential enclosure with the contactor component of each assembly pointing radially inward toward the reaction wheel 310 and positioned adjacent to the where the permanent magnets mounted on the reaction wheel will pass as the reaction wheel rotates. Contactor assemblies 312 are positioned around circular enclosure 304 and may be evenly spaced around the circumference of circular enclosure 304. Reaction wheel 310 may be a shaftless wheel to maximize the reduction of friction the reaction wheel is subjected to and, thereby, increase system longevity and reliability. Contactor assemblies 314 are positioned in the top enclosure 306 and contactor assemblies 316 are positioned in enclosure base 302, with both the contactor component of each assembly pointing radially inward toward the reaction wheel 310 and preferably positioned approximately even with the edge of circumferential rim of the reaction wheel closest to contactor assembly and positioned evenly spaced around the circumferential rim of the reaction wheel as well.

Enclosure base 302, a circumferential enclosure 304 and a top enclosure 306 may be made of non-magnet material such as, for example, plastic, aluminum, copper, some varieties of stainless steel, tungsten and combinations thereof including composite materials such as metal-matrix composites and reinforced plastics. In one embodiment, enclosure base 302 may be copper and circumferential enclosure 304 and a top enclosure 306 may be aluminum. Enclosure base 302, a circumferential enclosure 304 and a top enclosure 306 are of a suitable size so that with contactor assemblies positioned therein, a reaction wheel included therein is substantially freely floating when the reaction wheel assembly is in a substantially weightless environment and the reaction wheel is in motion, thereby leading to substantially frictionless operation. Enclosure base 302, a circumferential enclosure 304 and a top enclosure 306 are connected to one another using non-magnetic screws, bolts or other suitable means of attachment, including, for example, screws 318 to connect top enclosure 306 to circumferential enclosure 304 and screws 320 to connect enclosure base 302 to circumferential enclosure 304. Top enclosure 306 also includes connector 322 that is used to interface with leads on electromagnetic coils 136 and sensor information from encoders. Connector 322 is connected to top enclosure 306 utilizing screws, bolts or other means of attachment including, for example, jackposts 324. Nuts or a nutplate on the opposite end is used to secure the connector to top enclosure 306. Top enclosure 306 also includes vent 326 to relieve pressure differential between the interior of the enclosure with the outside environment during rapid ascent on the launch vehicle. Vent 326 can be made of, for example, a plurality of apertures, including, an array of circular holes.

Reaction wheel assembly 300 may also include magnetic sensor pads, such as those found in an encoder to determine the angular rate of the rotating reaction wheel, and the position of the embedded permanent magnets shown in FIG. 2A. A high-precision optical encoder, for example, may also be employed in spaceflight applications. A single encoder is sufficient, but additional units may provide more accurate control. When the state of the reaction wheel is known, the electromagnets in the contactor assemblies can be energized in sequence to drive the motion of the reaction wheel.

Figure 4:
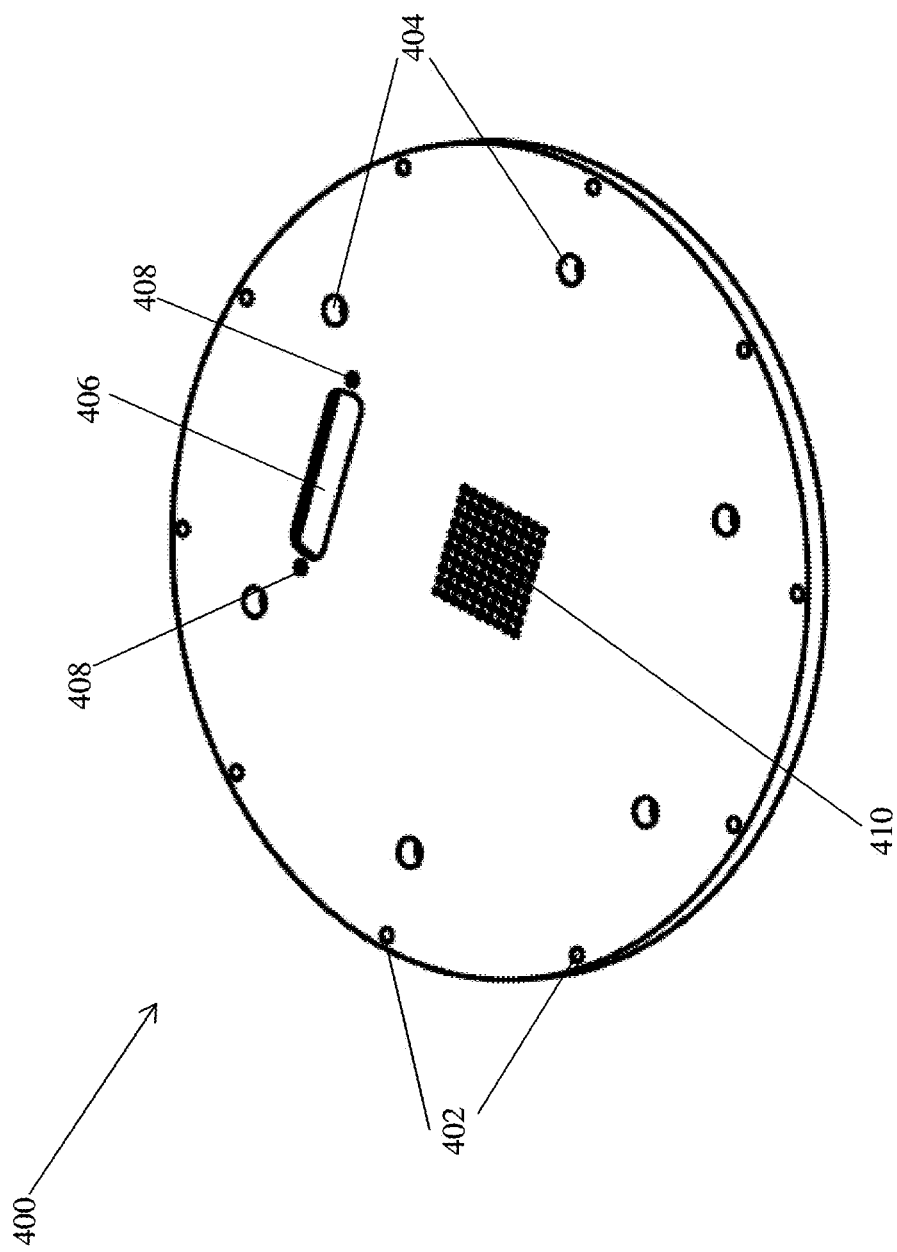
FIG. 4 is a top perspective view of a top enclosure of a reaction wheel system.

One exemplary embodiment of top enclosure 306 is shown in FIG. 4. Top enclosure 400 includes apertures 402 used to insert screws that can connect top enclosure 400 to a circumferential enclosure shown in FIG. 3. Apertures 404 can be used to position contactor assemblies and are threaded to allow spatial adjustment of contactor assemblies relative to the reaction wheel. Adhesives or nuts can be used to secure the contactor assemblies once the correct position has been achieved. Aperture 406 can be used to mount the connector connected to top enclosure shown in FIG. 3 and apertures 408 can be used to attach the connector. Vent 410 is also included in this embodiment.

Figure 5:
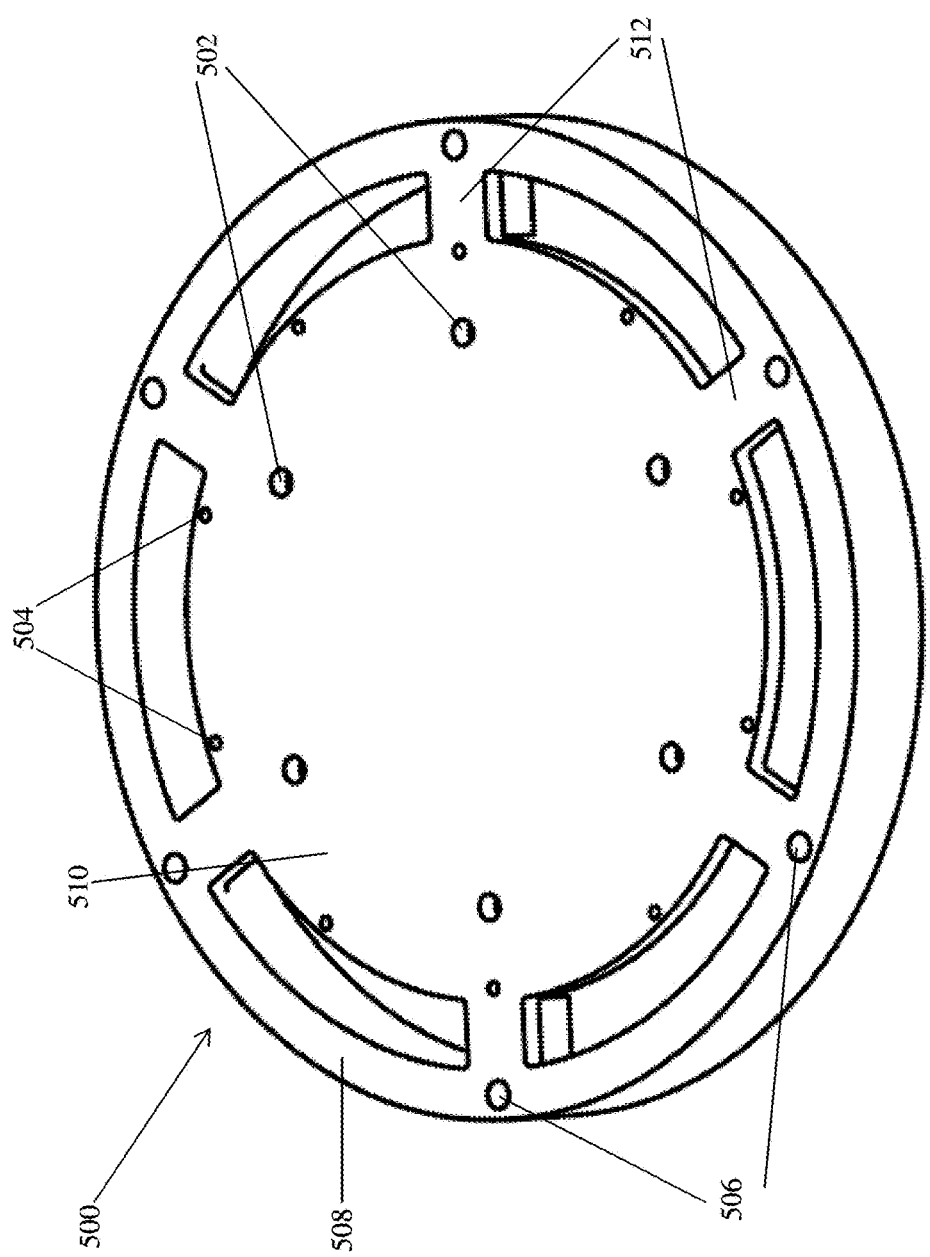
FIG. 5 is a top perspective view of an enclosure base of a reaction wheel system.

One exemplary embodiment of enclosure base 302 is shown in FIG. 5. Enclosure base 500 includes apertures 502, which are threaded and used to position contactor assemblies and apertures 504 can used to insert screws that can connect enclosure base 500 to a circumferential enclosure shown in FIG. 3. Apertures 506 can be used in cooperation with screws, bolts or other means of attachment to connect the enclosure base 500 directly or indirectly to the structure of a spacecraft. Enclosure base 500 includes a ring section 508 and a circular plate section 510 that are connected by radial arm sections 512. In this embodiment, ring section 508 includes apertures 506 and circular plate section 510 includes apertures 502 and 504.

Figure 6:
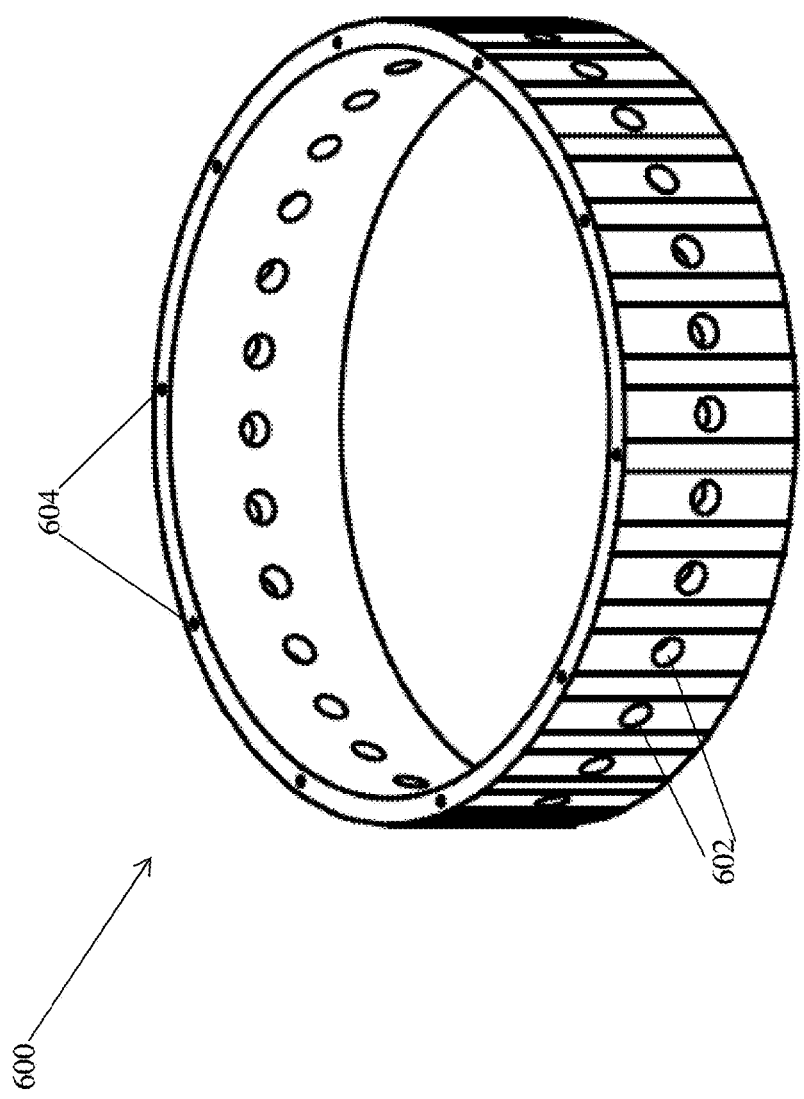
FIG. 6 is a top perspective view of a circumferential enclosure of a reaction wheel system.

One exemplary embodiment of circumferential enclosure 304 is shown in FIG. 6. Circumferential enclosure 600 includes apertures 602, which are threaded and used to position contactor assemblies and apertures 604 can used to insert screws that can connect circumferential enclosure 600 to either enclosure base or top enclosure shown in FIG. 3. Preferably, there are a matching series of apertures on the side opposite to that where apertures 604 are positioned that can be used to connect whichever of the enclosure base or top enclosure is not connected using apertures 604.

Figure 7:
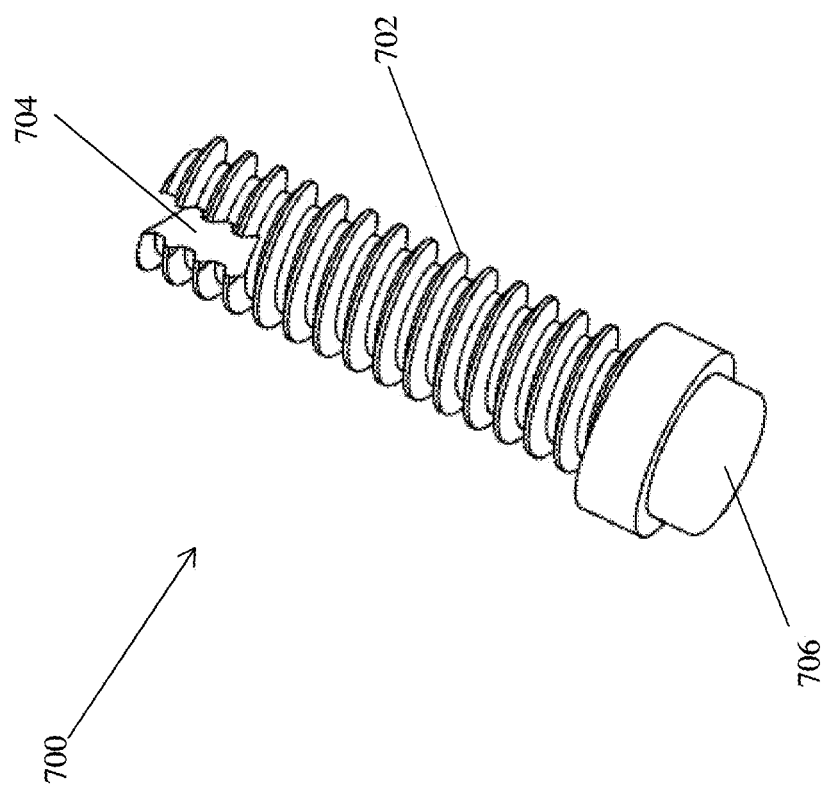
FIG. 7 is a bottom perspective view of a plunger of a contactor assembly.

Another exemplary embodiment of plunger 122 is shown in FIG. 7. Plunger 700 includes external helical flight 702 and split 704. Plunger 700 also includes a section 706 where a spring (not shown) can be attached. Although plungers 122 and 700 are different embodiments having different lengths, each can be equally utilized in a contactor assembly such as in exemplified in FIGS. 1A-1C.

A control module can be used to determine which contactor electromagnets to energize, when, and for how long. For example software code operating in a spacecraft may use encoder information to instruct the control module to power the electromagnets in order to make a specific adjustment to the attitude of the spacecraft. In the process, the circumferential contactor electromagnets are turned on (preferably as a pulse) to attract the permanent magnet toward the contact electromagnet, thereby inducing rotation of the reaction wheel. Alternatively, the electrical current can flow in an opposite direction to push the permanent magnet away from the contact electromagnet, thereby producing a similar, but opposite rotation on the reaction wheel. In the preferable embodiment, where the electromagnet is pulsed to induce rotation, the electromagnet is deenergized after the pulse until the controller instructs the contact electromagnet to energize again. More than one contactor electromagnet could be energized at a time. The control nodule receives information from the encoder and coordinates which contactor electromagnets to energize as well as continuously determining the rotation speed of the reaction wheel and the electromagnetic pulse length (which will need to shorten with increased reaction wheel speed) and to feedback rotation speed to the software operating the spacecraft. According to Newtonian laws of physics, as the reaction wheel increases in angular momentum in one direction, movement of the spacecraft spins in the opposite direction to conserve momentum. When in operation, the spin rate of the reaction wheel may range from about 1000 RPMs to about 50,000 RPMs, preferably from 3,000 RPMs to about 30,000 RPMs.

The number of contactor assemblies included in the containment structure can vary depending on preferred design and performance parameters, such as torque requirements, redundancy for fault tolerance, and volume constraints. For example, in FIG. 3, the enclosure base and top enclosure each may include from about 3 contactor assemblies to about 12 contactor assemblies, preferably each may include about 6 contactor assemblies, and the circumferential enclosure may include from about 3 contactor assemblies to about 60 contactor assemblies, preferably about 30 contactor assemblies.

The number of contactor assemblies used and the size of the contactor assemblies (e.g., the diameter of the copper wire, the number of turns of the copper wire wrapped around the housing, the external diameter size of contact assembly housing around which the copper wire is wrapped and the amount of electrical current passing through the copper wire) can also vary on design performance parameters such as spin rate control and torque. For example, a larger number of contactor assemblies positioned to drive the reaction wheel (e.g., smaller contactor assemblies and more contactor assemblies around the circumferential enclosure) may result in greater reaction wheel control due to finer precision in adjusting the spin rate but less maximum reaction wheel torque (i.e., spin rate), while the use of larger contact assemblies (e.g., larger contactor assemblies, for example, taking up more space around the circumferential enclosure) may result in greater maximum reaction wheel torque (i.e., spin rate) but less reaction wheel control (i.e., precision in adjusting the spin rate).

The reaction wheel may also be lubricated and include the presence of a layer of electrically non-conductive lubricant exhibiting low outgassing properties and good shear stability, (for example, Castrol Brayco 815Z or Castrol Braycote 601EF) on the surface of the reaction wheel that may encounter the contactor of the contactor assembly. A layer of lubricant is therefore preferably disposed between a substantial portion of the contactor surface and the surface of the reaction wheel when the reaction is not in operation. During such non-operation of the reaction wheel (e.g., when the reaction wheel is not rotating), the contactor of the contactor assembly, as shown, for example in FIGS. 1A-1C, is biased toward the reaction wheel by the spring of the contactor assembly. Once the reaction wheel becomes operable (e.g., when the reaction wheel is rotating), the contactor of the contactor assembly is distanced from the reaction wheel, by hydrodynamic pressure generation in the converging gap between the contactor and the reaction wheel, to allow the reaction wheel to float and operate substantially frictionless, and particularly in a substantially weightless environment, such as space. In addition to substantially frictionless operation, the free-floating state of the reaction wheel, which is mechanically decoupled from the contactors by the lubricant, provides jitter reduction, which helps to increase attitude stability and overall spacecraft pointing performance. When the reaction wheel is not in operation, for example, during launch and other portions of the flight, the contactor and lubricant combination secure the reaction wheel as well as provide cushioning and damping during potentially catastrophic g-loads during launch and during portions of the flight when the spacecraft may be subject to forces and changes of attitude and direction.

An exemplified embodiment of a spring that may be used in the contactor assembly is Part Number: LC 032B01S316 from Lee Spring Material (316 Stainless Steel), but may comprise of a phosphor bronze alloy that is optimally non-magnetic. In determining the specifications for the spring, the following relation may be useful:

$$f_n/f_{forcing} > 13$$

The frequency ratio (spring natural frequency to forcing frequency) is defined as $f_n$, the structural natural frequency of the spring which is in the exemplified embodiment 4 kHz, and $f_{forcing}$, the forcing frequency on the spring based on the angular rate and the surface characteristics of the outer circumference of the wheel. The frequency ratio, representing the number of octave separations from the fundamental structural mode, should be sufficiently large, i.e., greater than 13, to rule out significant harmonic excitation in the contactor assembly. Additionally, the spring design should be based on some optimization of minimizing the deflection from the expected quasi-static and random vibration loads expected during launch (using the frequency ratio), while also maximizing deflection due to hydrodynamic pressure generated during reaction wheel rotation. For example, the hydrodynamic pressure gradient generated in the lubricant for non-conformal contact between the contactor and reaction wheel can be estimated by:

$$\frac{\partial p}{\partial x} = 6u\mu \frac{[h - h_m]}{h^3}$$

where $\mu$ is the lubricant viscosity, p is the pressure between the lubricating surfaces, u is the tangential fluid velocity in the direction of x, h is an expression describing the film thickness, and $h_m$ is the location where the maximum pressure is located.

As a result of the reaction wheel system, for example, the system shown in FIG. 3 and the components thereof, the spring contactors of the contactor assemblies contacting a layer of lubricant disposed on the surface of the reaction wheel results in a passive release of the reaction wheel from the contactor assemblies when the electromagnets are energized, thereby causing motion in the reaction wheel to result. The release of the reaction wheel results from an increase in the hydrodynamic pressure in the lubricant, transitioning from boundary lubrication to fluid film lubrication, thereby releasing the reaction wheel from the contactors positioned, for example, on the enclosure base, circumferential enclosure and a top enclosure of the embodiment exemplified in FIG. 3. In summary, the lubricant operates in cooperation with the contactor assemblies as a passive release mechanism when the electromagnets induce rotation of the reaction wheel rotor and the hydrodynamic pressures that are generated push the contactor, into its housing and compress the spring against the plunger.

The containment structure and contactor assembly technologies herein related to reaction wheels may also be applied to a similar containment structure and contactor assembly technologies for use with reaction spheres that utilize a generally spherical rotor in a generally spherically shaped containment structure to achieve three-axis control and stabilization system for a spacecraft, in a single unit rather than three reaction wheel systems to achieve the same three-axis control and stabilization.

Preferably, the reaction wheel system operates in a substantially weightless environment of space and operates substantially frictionless and with reduced jitter. As a result, the longevity, reliability and efficiency of the reaction wheel system is increased as is that of the spacecraft in which it operates. There is less of a need for repair and replacement of parts which is much more complicated and burdensome, if not impossible, because the system is located and operates in space. Furthermore, the longevity, reliability and efficiency of the entire spacecraft is increased, thereby avoiding the tremendous cost of spacecraft replacement including the spacecraft itself as well as the launch vehicle and additional launch costs.

This written description uses examples as part of the disclosure, including the best mode, and also to enable any person skilled in the art to practice the disclosed implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A reaction wheel system for the control and stabilization of a spacecraft, the reaction wheel system comprising:
 a. A reaction wheel rotor that is substantially circular and has an exterior surface including a circumferential surface, the exterior surface comprising:
  i. A plurality of permanent magnets that are evenly spaced on the circumferential surface and are positioned such that the same magnetic pole of each faces outward, and
  ii. A lubricant;
 b. A containment structure stator for securing the reaction wheel rotor when not in rotation and for electromagnetically inducing substantially frictionless rotation of the reaction wheel rotor, the containment structure stator comprising:
  i. An enclosure including a wall defining an interior space in which the reaction wheel rotor is positioned, and
  ii. A plurality of contactor assemblies positioned in the wall to secure the reaction wheel rotor when not in rotation, each contactor assembly including:
   1. A housing with first and second ends and a channel therebetween;
   2. A contactor positioned at the first end of the housing and extending into and moveable in the channel of the housing; and
   3. A spring positioned in the channel of the housing and having first and second ends, the first end of the spring is connected to the contactor and the second end of the spring is moveably fixed in the channel of the housing,
  Wherein each contactor assembly is positioned in the wall of the enclosure such that the first end of the contactor assembly housing is positioned toward the reaction wheel rotor;
  iii. Electromagnets positioned in the wall to electromagnetically induce rotation of the reaction wheel rotor; and
  iv. A plurality of encoders to determine the position of the permanent magnets on the reaction wheel rotor,
 Wherein the lubricant is at least positioned on the exterior surface of the reaction wheel rotor that may contact each contactor of the contactor assembly and operates in cooperation with at least one contactor as a passive release mechanism when the electromagnets induce rotation of the reaction wheel rotor and hydrodynamic pressure is generated to push the contactor into the housing of the contactor assembly.

2. The reaction wheel system of claim 1, wherein the electromagnets are included in the contactor assembly.

3. The reaction wheel system of claim 2, wherein the electromagnet includes a length of wire having first and second ends wrapped around at least a portion of the housing of the contactor assembly, the first and second ends of said wire configured to be connected to an electrical power source.

4. The reaction wheel system of claim 3, wherein the wire is copper wire.

5. The reaction wheel system of claim 1, wherein the enclosure of the containment structure includes an enclosure base, a circumferential enclosure and a top enclosure and the circumferential enclosure includes the plurality of contactor assemblies.

6. The reaction wheel system of claim 1, wherein the enclosure base and the top enclosure further include the plurality of contactor assemblies.

7. The reaction wheel system of claim 1, wherein the reaction wheel rotor includes a plate section and a circumferential rim.

8. The reaction wheel system of claim 7, wherein the plate section includes openings and optionally may include counterweights positioned in the opening.

9. The reaction wheel system of claim 1, wherein the contactor is mounted in a bearing and the bearing is positioned in the channel of the housing.

10. The reaction wheel system of claim 1, wherein the contactor is polished and finished with a low coefficient of friction material including Diamond-Like Carbon (DLC).

11. The reaction wheel system of claim 1, wherein the lubricant is an electrically non-conductive lubricant exhibiting low outgassing properties and good shear stability.

12. The reaction wheel system of claim 11, wherein the electrically non-conductive lubricant exhibiting low outgassing properties and good shear stability is Castrol Brayco 815Z or Castrol Braycote 601EF.

13. A contactor assembly of a containment structure stator for securing a reaction wheel rotor when not in rotation and for electromagnetically inducing rotation of the reaction wheel rotor, the contactor assembly comprising:
  i. A housing with first and second ends and a channel therebetween;
  ii. A contactor positioned at the first end of the housing and extending into and moveable in the channel of the housing;
  iii. A spring positioned in the channel of the housing and having first and second ends, the first end of the spring is connected to the contactor and the second end of the spring is moveably fixed in the channel of the housing; and
  iv. An electromagnet including a length of wire having first and second ends wrapped around at least a portion of the housing of the contactor assembly, the first and second ends of said wire configured to be connected to an electrical power source;
  said contractor further including;
  a spring plunger positioned at the second end of the housing and extending into and moveably fixed in the channel of the housing and connected to the second end of the spring;
    a. The channel of the housing adjacent the second end having an internal wall with a helical flight;

b. A spring cap with an external helical flight, a central bore and an interior wall having an internal helical flight, the spring cap positioned at the second end of the housing such that the central bore is in alignment with the channel of the housing; and
  c. The spring plunger further including an external helical flight is positioned in the central bore of the spring cap, extending into and moveably fixed in the channel of the housing and connected to the second end of the spring, the external helical flight of the spring plunger being complementary to the internal helical flight of the spring cap.

14. The contactor of claim 13, further including:
  a. A washer with a central opening having a diameter at least large enough to have the spring plunger slide therethrough; and
  b. A nut with a central opening having an interior helical flight, the helical flight being complementary to the external helical flight of the spring plunger and the central opening having a diameter at least large enough for the interior helical flight of the nut to engage the external helical flight of the spring plunger.

15. The contactor of claim 13, wherein the wire is copper wire.

16. The contactor of claim 13, wherein the contactor is mounted in a bearing and the bearing is positioned in the channel of the housing.

17. The contactor of claim 13, wherein the contactor is polished and finished with a low coefficient of friction material including Diamond-Like Carbon (DLC).

18. A reaction wheel system for the control and stabilization of a spacecraft, the reaction wheel system comprising:
  a. A reaction wheel rotor that is substantially circular and has an exterior surface including a circumferential surface, the exterior surface comprising:
    i. A plurality of permanent magnets that are evenly spaced on the circumferential surface and are positioned such that the same magnetic pole of each faces outward, and
    ii. An electrically non-conductive lubricant exhibiting low outgassing properties and good shear stability;
  b. A containment structure stator for securing the reaction wheel rotor when not in rotation and for electromagnetically inducing substantially frictionless rotation of the reaction wheel rotor, the containment structure stator comprising:
    i. An enclosure including a wall defining an interior space in which the reaction wheel rotor is positioned, and
    ii. A plurality of contactor assemblies positioned in the wall to secure the reaction wheel rotor when not in rotation, each contactor assembly including:
      1. A housing with first and second ends and a channel therebetween;
      2. A bearing positioned in the channel and at the first end of the housing;
      3. A contactor positioned and moveable in the bearing at the first end of the housing and extending into and moveable in the channel of the housing, the contactor polished and finished with a low friction Diamond-Like Carbon (DLC) coating;
      4. A spring positioned in the channel of the housing and having first and second ends, the first end of the spring is connected to the contactor and the second end of the spring is moveably fixed in the channel of the housing; and 5. An electromagnet including a length of wire having first and second ends wrapped around at least a portion of the housing of the contactor assembly, the first and second ends of said wire configured to be connected to an electrical power source, Wherein each contactor assembly is positioned in the wall of the enclosure such that the first end of the contactor assembly housing is positioned toward the reaction wheel rotor; and iii. A plurality of encoders to determine the position of the permanent magnets on the reaction wheel rotor, Wherein the lubricant is at least positioned on the exterior surface of the reaction wheel rotor that may contact each contactor of the contactor assembly and operates in cooperation with at least one contactor as a passive release mechanism when the electromagnets induce rotation of the reaction wheel rotor and hydrodynamic pressure is generated to push the contactor into the housing of the contactor assembly.

* * * * *